Figure 1:
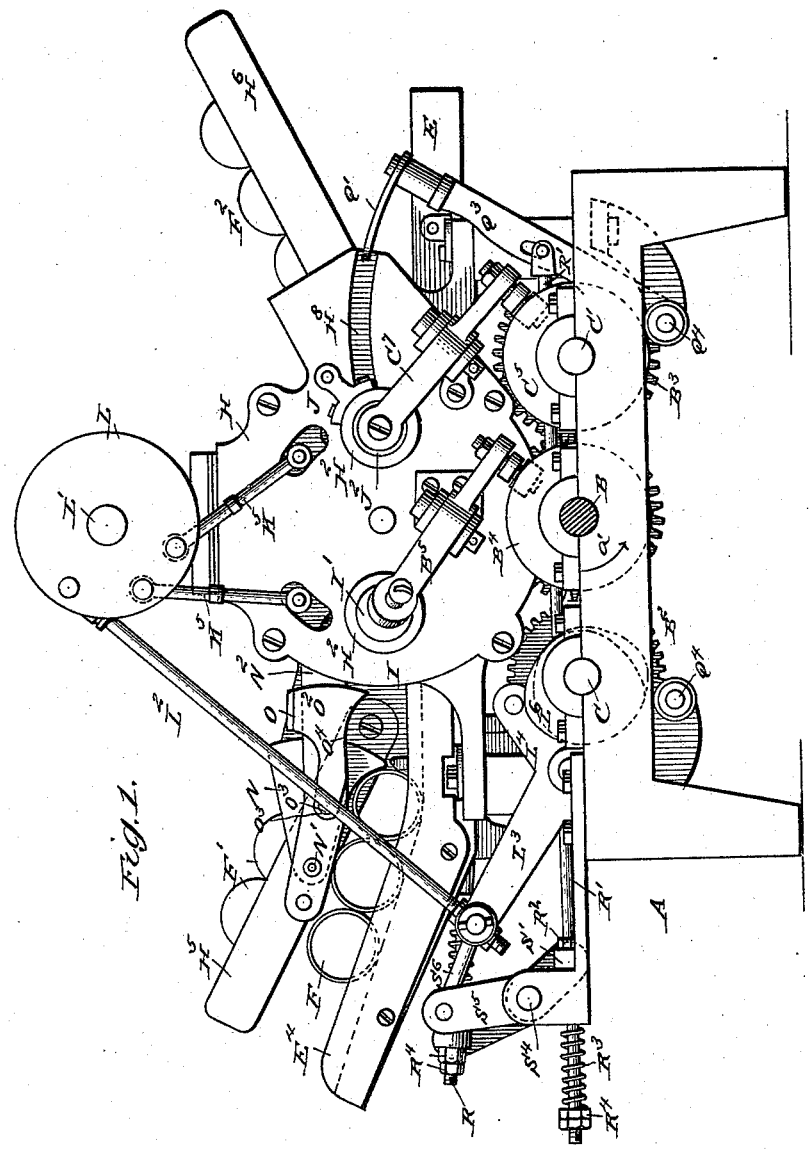

(No Model.) 7 Sheets—Sheet 1.
M. JENSEN.
CAN CAPPING AND CRIMPING MACHINE.
No. 470,575. Patented Mar. 8, 1892.

WITNESSES:
W. R. Davis.
C. Sedgwick.

INVENTOR:
M. Jensen
BY Munn & Co.
ATTORNEYS

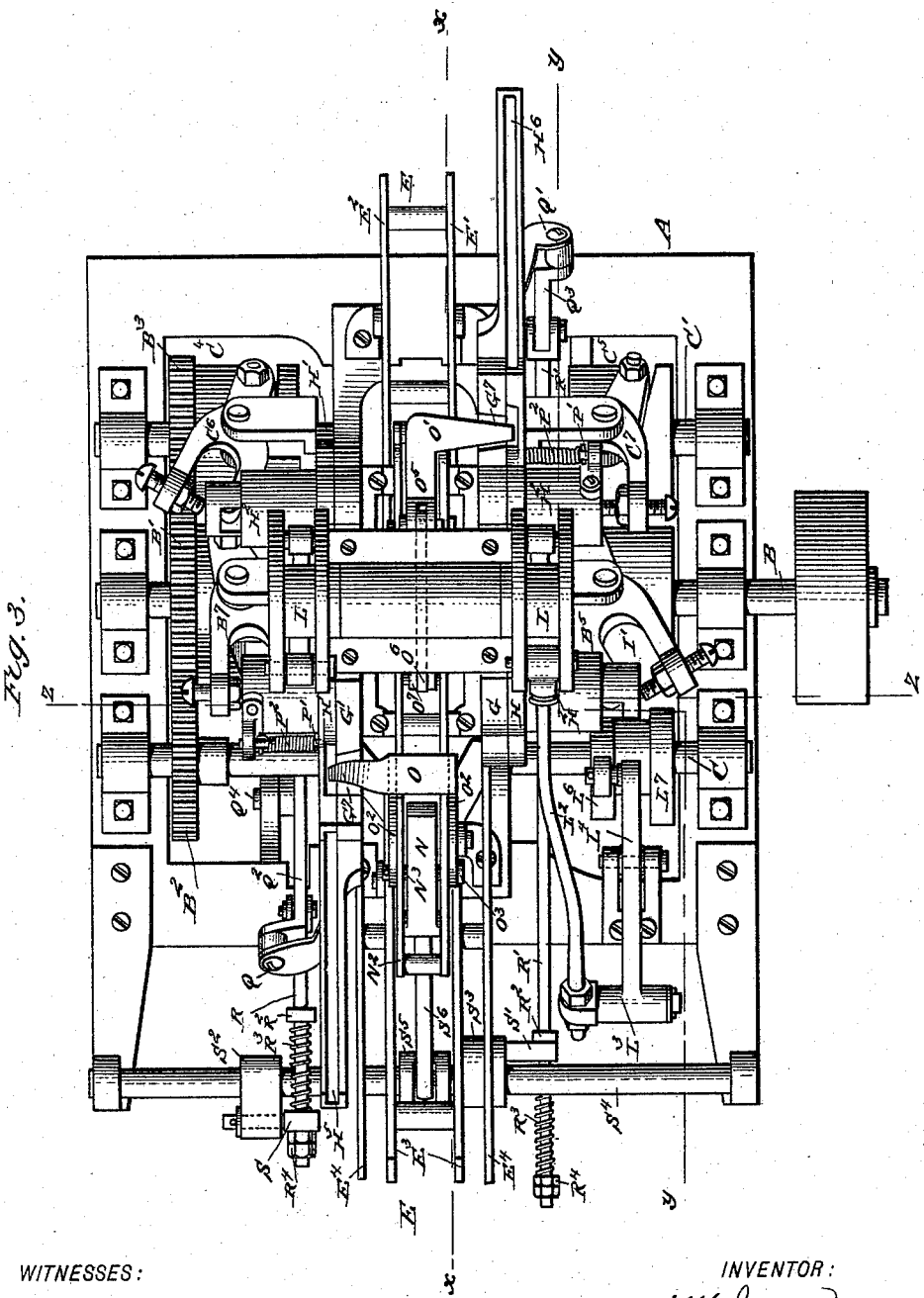

(No Model.)
7 Sheets—Sheet 2.
M. JENSEN.
CAN CAPPING AND CRIMPING MACHINE.
No. 470,575.
Patented Mar. 8, 1892.
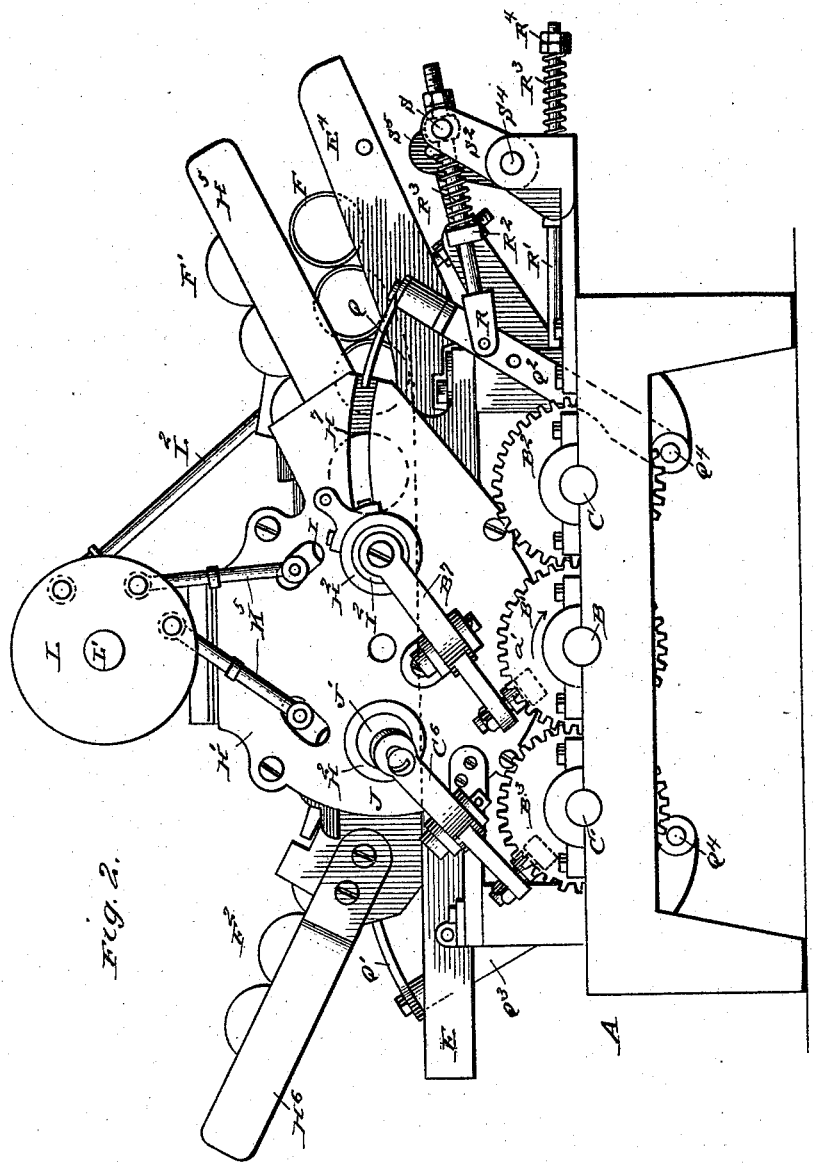
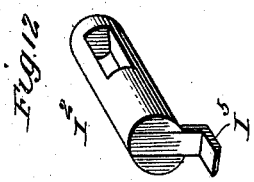
WITNESSES:
INVENTOR:
M. Jensen
BY Munn & Co.
ATTORNEYS

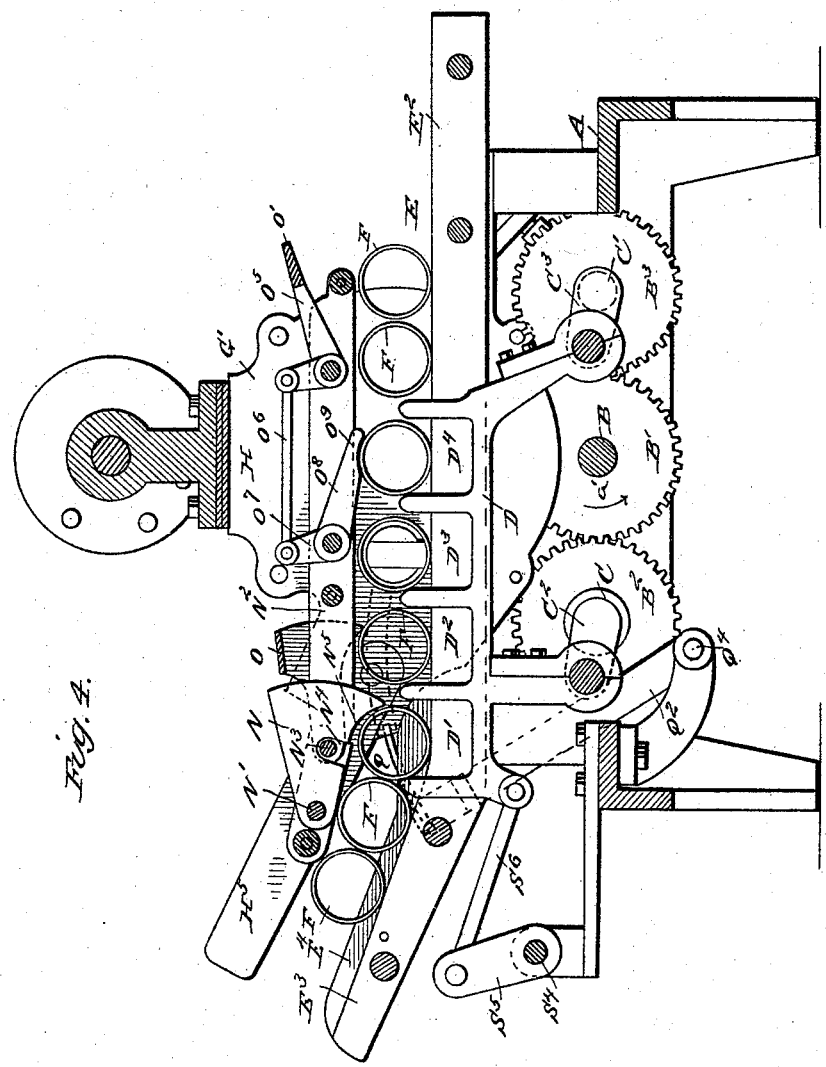

(No Model.) 7 Sheets—Sheet 5.
M. JENSEN.
CAN CAPPING AND CRIMPING MACHINE.
No. 470,575. Patented Mar. 8, 1892.
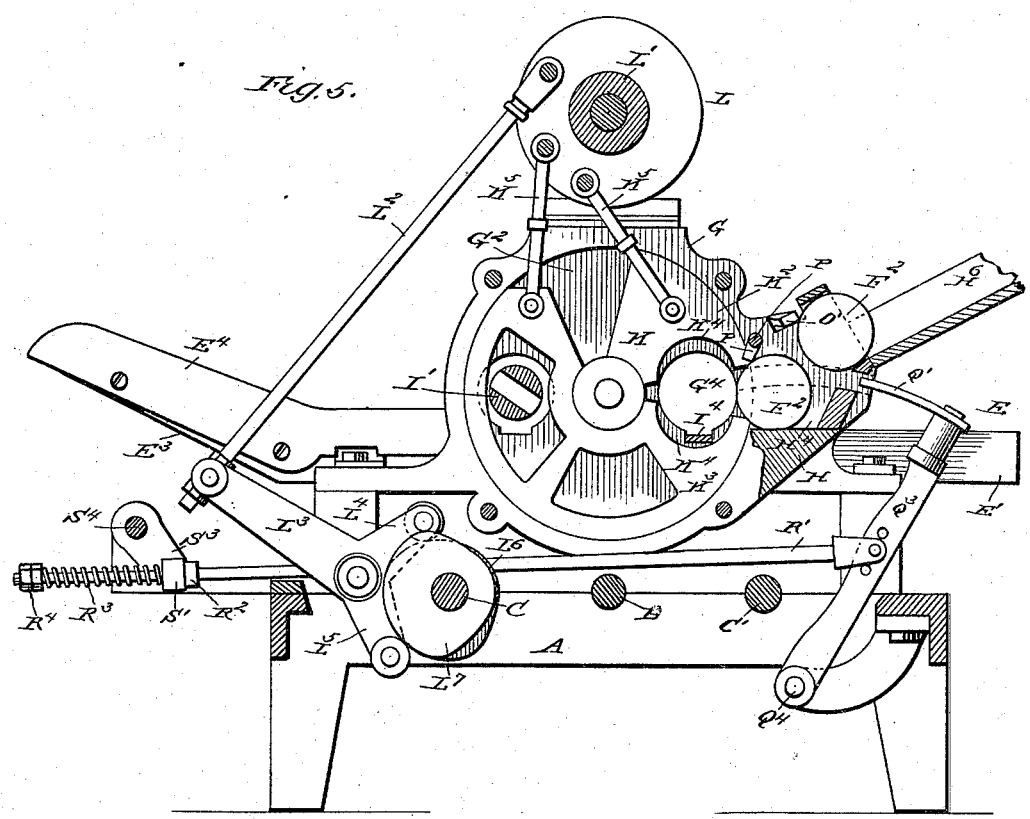
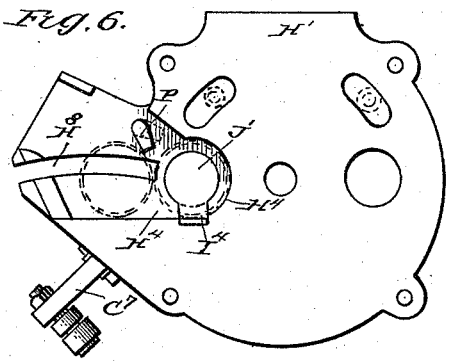
WITNESSES:
INVENTOR:
M. Jensen
BY Munn & Co.
ATTORNEYS (No Model.) 7 Sheets—Sheet 6.
M. JENSEN.
CAN CAPPING AND CRIMPING MACHINE.
No. 470,575. Patented Mar. 8, 1892.
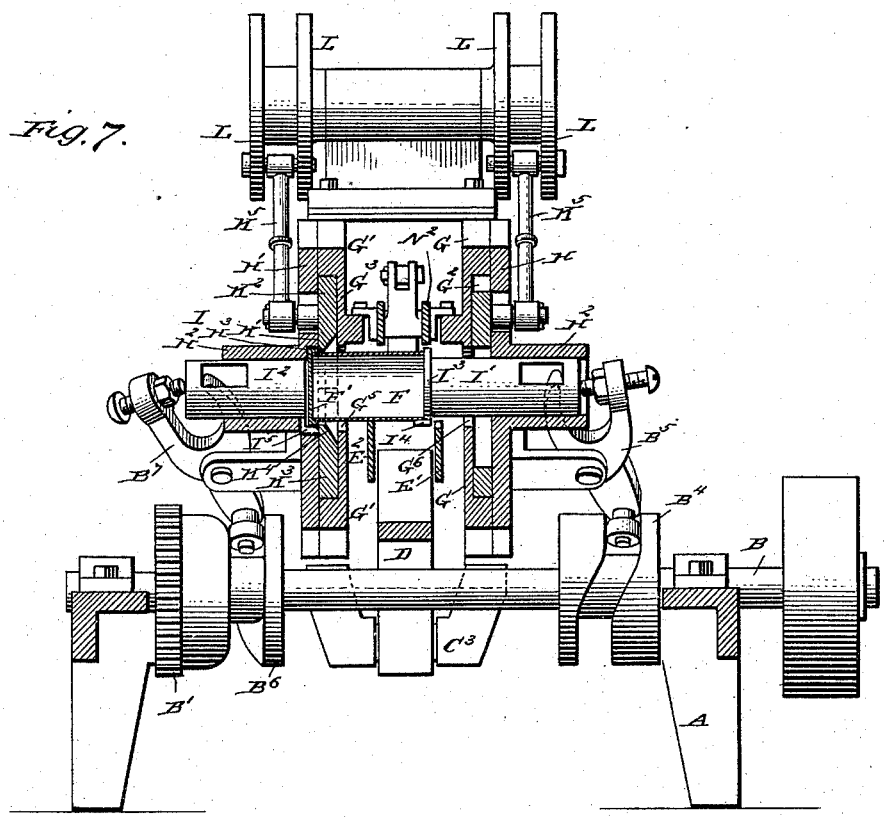
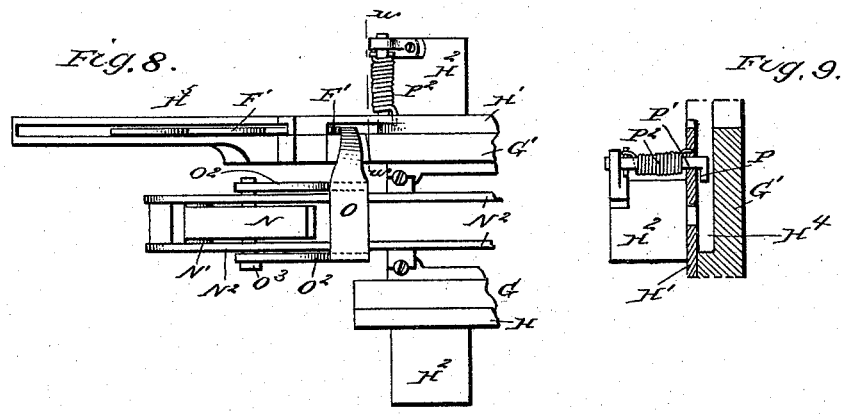
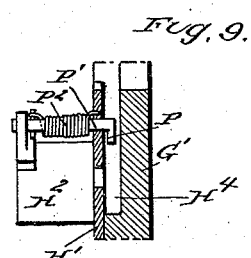
WITNESSES:
INVENTOR:
M. Jensen
BY Munn & Co.
ATTORNEYS

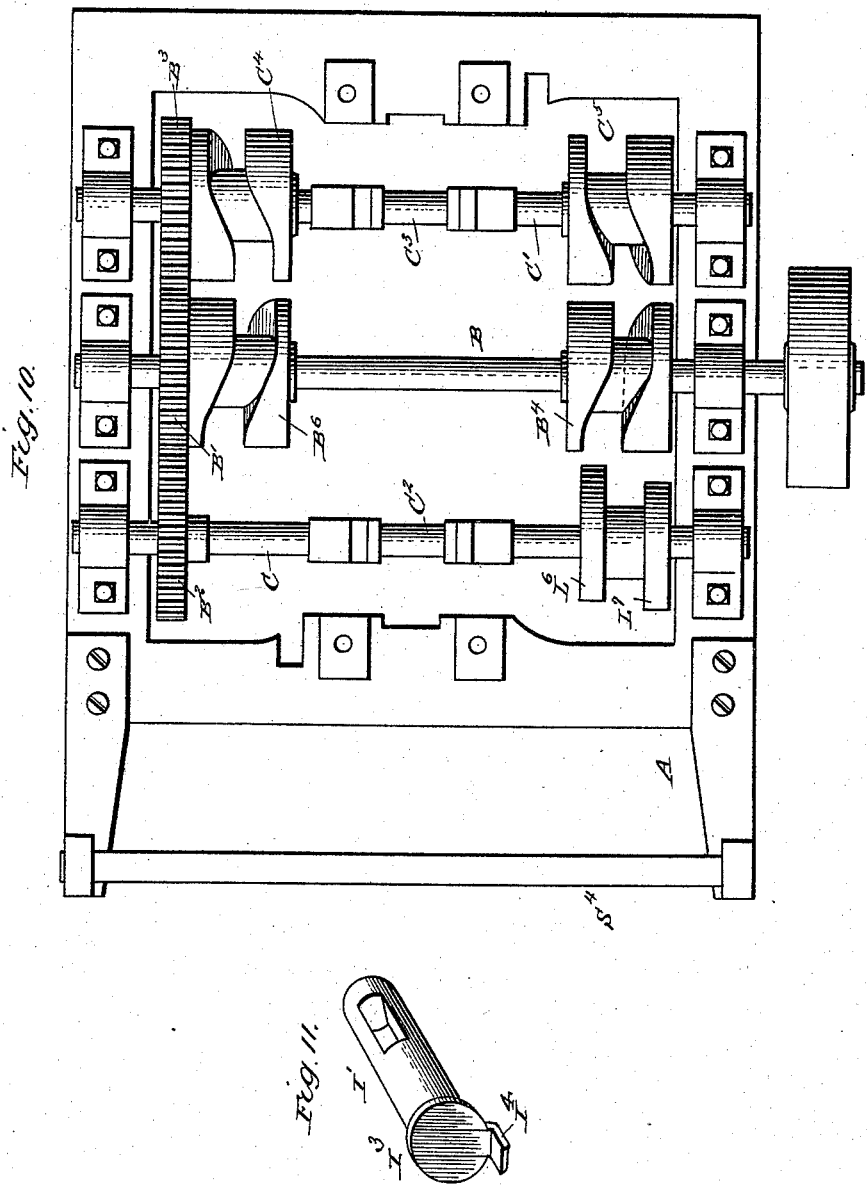

UNITED STATES PATENT OFFICE.

MATHIAS JENSEN, OF ASTORIA, OREGON, ASSIGNOR OF ONE-HALF TO THE JENSEN CAN FILLING MACHINE COMPANY, OF SAME PLACE.

CAN CAPPING AND CRIMPING MACHINE.

SPECIFICATION forming part of Letters Patent No. 470,575, dated March 8, 1892.

Application filed June 5, 1891. Serial No. 395,213. (No model.)

*To all whom it may concern:*

Be it known that I, MATHIAS JENSEN, of Astoria, in the county of Clatsop and State of Oregon, have invented a new and Improved Can Capping and Crimping Machine, of which the following is a clear and exact description.

The principle of this machine consists in automatically conveying the caps one at a time to the narrow end of a tapered hole and the can bodies through said hole one at a time into a cap such as shown in Letters Patent of the United States No. 376,804, granted to me January 24, 1888, and in Letters Patent of the United States No. 443,445, granted to me December 23, 1890.

The invention consists in an improved mode of applying that principle so that both ends of the can-bodies are capped with rapidity and certainty, and which is accomplished, principally, by arranging two sets of jaws opposite each other and each adapted to close and form a tapered hole, and means to convey the caps one at a time to the narrow end of each of said holes and the can-bodies first one end through one of said holes into a cap and afterward the opposite end through the other hole into another cap, and the can-bodies following each other, so that the end of one can-body is forced into one cap, while the opposite end of another is at the same time forced into another cap, and the capped cans released to roll off one after another, the same as will be described hereinafter by reference to the accompanying drawings, forming a part of this specification, in which similar letters of reference indicate corresponding parts in all the figures.

Figure 1 is a side elevation of the improvement. Fig. 2 is a like view of the other side of the improvement. Fig. 3 is a plan view of the same. Fig. 4 is a longitudinal section of the same on the line $x\ x$ of Fig. 3. Fig. 5 is a like view of the same on the line $y\ y$ of Fig. 3. Fig. 6 is an inside face view of one of the cap-holding plates. Fig. 7 is a transverse section of the improvement on the line $z\ z$ of Fig. 3. Fig. 8 is a plan view of the feed mechanism for the caps. Fig. 9 is a transverse section of part of the same on the line $w\ w$ of Fig. 8. Fig. 10 is a plan view of the driving mechanism. Fig. 11 is a perspective view of one of the can-body plungers, and Fig. 12 is a like view of the cap-plungers.

The improved can-capping machine is mounted on a suitably-constructed main frame A, in which is journaled in suitable bearings a transversely-extending main driving-shaft B, connected in the usual manner with suitable machinery for imparting a rotary motion to the said shaft in the direction of the arrow $a'$. (See Fig. 1.)

On the main driving-shaft B is secured a gear-wheel B' in mesh at opposite sides with the two gear-wheels $B^2$ and $B^3$, secured on the shafts C and C', respectively, also mounted to turn in suitable bearings in the main frame A and extending parallel with the main driving-shaft B. At or near the middles of the shafts C and C' are formed the crank-arms $C^2$ and $C^3$, respectively, pivotally connected with the under side of a conveyer D, which receives a vertical and longitudinal reciprocating motion by the said crank-arms when the main driving-shaft B is rotated and the shafts C and C' are set in motion thereby.

The conveyer D is provided on its upper side with four recesses D', $D^2$, $D^3$, and $D^4$, arranged one in front of the other and serving to carry the can-body forward on the passageway or track E, formed of two rails E' and $E^2$, secured on the upper part of the main frame A, the said conveyer D moving between the two rails. The rails E and E' extend horizontally, as is plainly shown in Fig. 4, and continue at one end on the feed side of the machine into the upward extensions $E^3$, on which the can-bodies F are placed to roll down onto the horizontal tracks E' and $E^2$. In order to guide the can-bodies F on the extensions $E^3$, side rails $E^4$ are provided, arranged outside of and parallel with the rails E' and $E^2$ and placed a distance apart equal to the length of the can-bodies F. The top edges of the guide-rails $E^4$ extend above the tops of the extensions $E^3$ to prevent lateral displacement of the can-bodies while traveling down the inclined extensions $E^3$. The can-bodies after leaving the lower ends of the guide-rails $E^4$ pass between the plates G and G', arranged outside of the track-rails E' and $E^2$ and secured on the upper part of the main frame A. On the outsides of the plates G and G' are secured the plates H and H', respectively, in which are mounted to slide transversely two sets of plungers I and J, of which the set of plungers I consists of the can-body push-plunger I' and the cap-plunger $I^2$, the latter forming a resistance for the caps F', adapted to be fastened or pressed onto one end of the respective can-body F. The other set of plungers J consists of a similar push-plunger and resistance-plunger J' and $J^2$, of which the plunger J' serves to move the can-body, while the plunger $J^2$ forms a resistance for the cap $F^2$, adapted to be fastened to the other end of can-body. The several plungers I', $I^2$, J', and $J^2$ are fitted to slide in cylinders $H^2$, formed on the outsides of the plates H and H'. The plungers I' and $J^2$ are mounted in cylinders on the plate H, while the plungers $I^2$ and J' are arranged in cylinders $H^2$ on the plate H'.

The can-body push-plungers I' and J' are each provided on the inner end with an annular flange $I^3$, on the lower side of which is secured a foot $I^4$, on which the lower part of the can-body F rests at the time the respective plunger moves the can-body transversely. The plungers $I^2$ and $J^2$ are without annular flanges; but each of them is provided with a foot $I^5$, similar to the foot $I^4$ and serving to support the lower sides of the caps F' and $F^2$, respectively, when moving the latter with the can-body transversely, as hereinafter more fully described.

The plates G and G' are provided on their outer faces with annular recesses $G^2$, (see Fig. 5,) in which are arranged the sets of jaws K and K', respectively, each provided with two members $K^2$ and $K^3$, formed with opposite semicircular recesses $K^4$, the inner faces of which are slightly beveled, as is plainly shown in Fig. 7. When the two members $K^2$ and $K^3$ of the set of jaws K are closed, they form a circular opening concentric with a circular opening $G^4$, formed in the plate G and in line with the plungers J' and $J^2$. The members of the other set of jaws K' form when closed a circular opening concentric with a circular opening $G^5$, formed in the plate G' and in line with the plungers $I^2$ and I'. The plate G is also provided with a circular opening $G^6$ for the passage of the plunger I' and its annular flange $I^3$, and a similar opening is formed in the plate G' for the passage of the plunger J' and its flange. The members $K^3$ of the sets of jaws K and K' are also provided with openings for the passage of the plungers I' and J', as is plainly shown in Fig. 5.

In the plate H' at the inner end of the bore of the cylinder $H^2$ for the plunger $I^2$ is formed a large recess $H^3$, into which passes a cap F', adapted to be fastened on one end of the respective can-body F. A similar recess $H^4$ is formed in the plate H at the inner end of the bore of the cylinder $H^2$ for the plunger $J^2$, the said recess forming a resting-place for the caps $F^3$, adapted to be pressed onto the other end of the can-body F. The recesses $H^3$ and $H^4$ connect at one side with chutes $H^5$ and $H^6$, respectively, in which the caps F' and $F^2$, respectively, are placed one behind the other, as is plainly shown in the drawings.

The plungers I' and $I^2$ are reciprocated from the main driving-shaft B, the latter being provided for this purpose with the cam-wheels $B^4$ and $B^6$, respectively, of which the cam-wheel $B^4$ actuates a lever $B^5$, connected with the plunger I', while the cam-wheel $B^6$ actuates a lever $B^7$, connected with the plunger $I^2$. The construction of the levers $B^5$ and $B^7$ is similar to the construction of the one shown and described in detail in the Letters Patent of the United States No. 448,047, granted to me March 10, 1891.

The plungers J' and $J^2$ are simultaneously reciprocated from the shaft C', which latter is provided for this purpose with the cam-wheels $C^4$ and $C^5$, adapted to actuate levers $C^6$ and $C^7$, respectively, similar to the levers $B^5$ and $B^7$ and connected with the plungers J' and $J^2$, respectively. The cam-wheels $B^4$ and $C^4$ are arranged with relation to each other, so as to actuate the plungers I' and J' simultaneously and in opposite directions, and the cam-wheels $C^5$ and $B^6$ are similarly arranged to simultaneously actuate the plungers $I^2$ and $J^2$. The inward motion of the plungers I' and J' takes place at the time that the plunges $I^2$ and $J^2$ are at rest in an outermost position, and the plungers $I^2$ and $J^2$ move inward at the time the plungers I' and J' recede from the innermost position. The plungers $I^2$ and $J^2$ move into an innermost position at the time that the other plungers I' and J' are at rest.

The members $K^2$ and $K^3$ of the sets of jaws K' and K are pivotally connected by links $K^5$ with crank-disks L, secured on a shaft L' mounted to turn in suitable bearings secured on the tops of the plates G and G'. One of the crank-disks L is pivotally connected by a link $L^2$ with a lever $L^3$, fulcrumed on the main frame and provided with two arms $L^4$ and $L^5$, carrying friction-rollers mounted to travel on the peripheries of the cam-wheels $L^6$ and $L^7$, respectively, secured on the shaft C. When the latter is rotated, the said cam-wheels $L^6$ and $L^7$ impart a swinging motion to the lever $L^3$, so that an oscillating motion is given to the crank-disks L, whereby the members $K^2$ and $K^3$ of the sets of jaws K and K' are simultaneously opened and closed. The cam-wheels $L^6$ and $L^7$ are arranged relatively to the cam-wheels on the shafts B and C', so that the members $K^2$ and $K^3$ of the sets of jaws K and K' close at the time when the plungers $I^2$ and $J^2$ are in their outermost position and are closed previously to the inward movement of the plungers I' and J'. The members $K^2$ and $K^3$ of the two sets of jaws commence to open previously to the outward movement of the plungers I' and J' and are completely opened previously to the inward movement of the plungers I² and J².

In order to hold a can-body F at rest at the junction of the track-rails E' and E² with their extensions E³, a weighted lever N is provided, pivoted at N' on the frame N², rigidly fastened to the plates G and G', directly over the track E. The downward swinging motion of the lever N is limited by a stop-pin N³, secured in the frame N² and engaging a slot N⁴, formed in the under side of the said lever N. The latter is curved at its under edge at N⁵, as plainly shown in Fig. 4, so as to engage the top and part of the front of the periphery of the respective can-body F.

In order to prevent the can-caps F' and F² from rolling into the recesses H³ and H⁴, except when a can-body has arrived to receive it, the releasing-arms O and O' are respectively provided, of which the arm O extends through a notch G⁷ in the top of the plate G' into the upper part of the chute H⁵, so as to be in the path of the caps F', passing down the said chute. The arm O is held on the levers O², pivoted at O³ to the frame N², previously mentioned. The levers O² are curved at their under edges at O⁴, so as to be engaged by the can-bodies F when the same are moved forward by the conveyer D, as hereinafter more fully described. The arm O' extends through a notch G⁷ in the plate G to reach with its outer end into the chute H⁶, so as to be in the path of the caps F². This arm O' is held on a bell-crank lever O⁵, pivoted in the rear end of the frame N² and pivotally connected by a link O⁶ with the arm O⁷ of a bell-crank lever, the other arm O⁸ of which is curved at its free end and at the under side at O⁹, to be engaged at this place by the peripheries of the can-bodies as they are moved off by the conveyer D. (See Fig. 4.) Into each of the recesses H³ and H⁴ also projects an arm P, which is formed on a shaft P', journaled in suitable bearings and provided with a coil-spring P², one end of which is fastened to the said shaft and the other to the respective plate H or H', so as to hold the arms in the proper position to prevent a cap from passing into the circular parts of the recesses H³ and H⁴ in the path of the respective plungers.

In order to push the can-caps into the recesses H³ and H⁴, arms Q and Q', respectively, are provided, extending through slots H⁷ and H⁸, respectively, in the plates H and H', said slots being segmental and in line with the centers of the recesses H³ and H⁴. (See Fig. 6.) The arms Q and Q' are secured on the upper ends of levers Q² and Q³, respectively, fulcrumed at their lower ends at Q⁴ on brackets secured to the main frame. The levers Q² and Q³ are pivotally connected with rods R and R', respectively, yieldingly connected with studs S and S', respectively, mounted to turn in crank-arms S² and S³, respectively, secured on a transversely-extending shaft S⁴, mounted to turn in suitable bearings in the front end of the main frame A, the said shaft S⁴ being provided with a crank-arm S⁵, pivotally connected by a link S⁶ with the under side of the conveyer D, so that when the latter is actuated, as previously described, a rocking motion is imparted to the said shaft S⁴.

In order to connect the rods R and R' yieldingly with their respective studs S and S', a spring R³ is coiled on each of the rods and presses with one end against the stud and with its other end against the collar R² on the rod R and against the nuts R⁴ on the rod R'. The nuts R⁴ are also formed on the rod R, but are adapted to abut against the outer face of the stud S, the other rod R' being provided with a collar R², which abuts against the inside of its respective stud S'. The nuts R⁴ serve to regulate the tension of the springs R³. The crank-arms S² and S³ are arranged diametrically opposite each other, so that a simultaneous motion is imparted to the levers Q² and Q³ in opposite directions, whereby the arms Q and Q' simultaneously move inward or outward in their respective slots H⁷ and H⁸. On the inward movement of the said arms Q and Q' they strike against the lowermost caps in the chutes H⁵ and H⁶ and push the said caps past the yielding arms P into the recesses H³ and H⁴, respectively, so that the caps are in the paths of the plungers I² and J², respectively.

The operation is as follows: The can-bodies F are fed one after the other down the inclined extension E³, so that the lowermost body abuts against the curved under side N⁵ of the weighted lever N. The chutes H⁵ and H⁶ are filled with caps F' and F², respectively, so that their flanges extend inward, the lowermost caps being arrested by the arms P and the next caps being arrested by the arms O and O', respectively. Now, when the main driving-shaft B is set in motion a similar rotary motion is imparted to the shafts C and and C', which by their crank-arms C² and C³ impart a vertical and longitudinal movement to the conveyer D, which by its front recess D' engages the lowermost can-body F, held by the lever N. The conveyer D moves this can-body forward, the lever N swinging upward, riding freely on the periphery of the said can-body. The forward movement of the conveyer D moves the can-body held in the recess D' forward on the track-rails E and E', the periphery of the can-body engaging the curved under sides O⁴ of the levers O², carrying the arm O. The can-body is thus arrested in its forward movement at the time the conveyer D swings downward and disengages its recess D' from the said can-body. At the next upward and forward swinging motion of the conveyer D the can-body is engaged by the second recess D² of the said conveyer and moved forward by the latter on the track E, so as to come in line with the plungers I' and I². At this forward movement of the can-body the levers O² are raised by the said can-body, so that the arm O swings upward and releases one of the caps F', the cap passing down to be moved forward by the arm Q into the recess H³, so as to be in line with the can-body. At this time the plunger I² is in its outermost position, as shown in Fig. 7, and on the further revolution of the shaft B the plunger I' is actuated—that is, slides inward and presses with its annular flange I³ on one end of the can-body F to move the same to one side through the opening G⁵ in the plate G', into and through the circular opening formed by the two members K² and K³ of the set of jaws K', which thus guide this end of the can-body into the cap F', held in the recess H³. As soon as this has been accomplished the members K² and K³ of the set of jaws K' open and the plunger I' commences to recede, while the plunger I² is now moved inward, thus pressing the body F, with one cap in place, back into its former position on the track E. The plunger I² then again recedes to its former position, and the conveyer D again takes hold with its recess D³ of the can-body F, with the cap F' in place, and moves the same forward to an intermediate position between the sets of plungers I and J. The can-body in this intermediate position is engaged on top by the curved under side O⁹ of the arm O⁸ of the bell-crank lever, and at the next upward movement of the conveyer D the said can-body is engaged by the recess D⁴ and moved forward in line with the plungers J' and J². On this forward movement of the can-body the latter causes the arm O⁸ of the bell-crank lever O⁷ to swing, so that the arm O' releases the lowermost cap in the chute H⁶, the said cap passing downward and being moved forward into the recess H⁴ by the action of the arm O', previously described. The plungers J' and J² are at this time in an outermost position, and on the further rotation of the shaft B the plunger J' moves inward and presses with its annular flange I³ on the cap F' at this end of the can-body, so as to force the latter to one side to the right, the open end of the can-body passing into the circular opening formed by the members K² and K³ of the set of jaws K, and also into the cap F², which is at that instant held yieldingly by the arm Q' in the recess H⁴. As soon as this cap F² is on the can-body the set of jaws K open, the plunger J' commences to recede, and the plunger J² moves inward, thus forcing the can-body, with the two caps on the front and back, onto the track E', on which the capped can-body is moved forward by the rear end of the conveyer D. The capped can-body then rolls off the track E.

The same operation as above described takes place with the can-bodies and caps following those just described—that is, on each forward stroke of the conveyer D a can-body is moved forward to the next position, and forced into the cap, first one end and afterwards the other, and released while the conveyer is on its backward strokes.

Having thus described my invention, I claim as new and desire to secure by Letters Patent—

1. In a can-capping machine, the combination, with a passage-way for the can-bodies, of two sets of plungers arranged one in advance of the other and at right angles to the passage-way, of two sets of jaws each adapted to close and form a tapered hole, one on each side of said passage and one in line with each set of said plungers, and suitable means to convey the caps one at a time to the narrow end of each of said tapered holes and the can-bodies one after another, so that one end of each is first forced through one of said tapered holes into a cap and afterward the opposite end through the other hole into another cap and the capped cans released, substantially as shown and described.

2. In a can-capping machine, the combination, with a passage for the can-body, of a pair of aligned plungers at right angles to and at opposite sides of the passage, one of the plungers forming an abutment for a can-head and remaining stationary while the other plunger forces the can-body across the passage into the head, the latter plunger then receding and the first-named plunger pushing the headed can back into the passage, and means for thus operating the said plungers, substantially as set forth.

3. In a can-capping machine, the combination, with a passage and two clamping or guiding jaws at one side of the passage, the opening between the jaws being tapered around its edge adjacent to the passage, of a pair of aligned plungers at opposite sides of the passage and opening and in line with the latter, a can-head-receiving recess or chamber being formed between the end of one plunger and said tapered opening and said end serving as an anvil or abutment for said head when the opposite plunger forces the can-body through the opening thereinto and then recedes, and means for opening the said jaws and forcing the first-named plunger inward to push the headed can back into the passage, substantially as set forth.

4. In a can-capping machine, the combination, with a track or passage-way for the can-bodies, of two sets of plungers arranged one in advance of the other and at right angles to said track, each set having two plungers opposite each other and on opposite sides of said track, of a conveyer adapted to move a can-body forward in said track first between one of said sets of plungers by which it is pushed across the track and one end forced into a cap and afterward between the other set of plungers by which it is pushed and the other end forced into another cap and the capped can pushed back and conveyed forward on the track, substantially as shown and described.

5. In a can-capping machine, the combination, with a track or passage-way for the can-bodies and a conveyer for moving the can-bodies forward on the said track, of two sets of plungers arranged one in advance of the other and at right angles to the said passage-way or track, each set of plungers consisting of two plungers arranged opposite each other at opposite sides of the said track and of which one serves to push the can-body across the track into the cap and the other to push the capped can back again, the two sets of plungers being arranged on opposite sides of the track, so that a cap is placed on the can-body at each end, and automatic cap-feeding devices arranged on opposite sides of the track and delivering the caps one at a time in line with each set of plungers, substantially as shown and described.

6. In a can-capping machine, the combination, with a track or passage-way for the can-bodies and a conveyer for moving the can-bodies forward on the said track, of two sets of plungers arranged one in advance of the other and at right angles to the said passage-way or track, each set of plungers consisting of two plungers arranged opposite each other at opposite sides of the said track and of which one serves to push the can-body across the track into the cap and the other to push it back, the two sets of plungers being arranged on opposite sides of the track, so that a cap is placed on a can-body at each end, and sets of jaws arranged on opposite sides of the track and forming when the jaws are closed circular openings concentric with the sets of plungers, substantially as shown and described.

7. In a can-capping machine, the combination, with a track or passage-way for the can-bodies, provided with an inclined extension and two sets of plungers, one in front of the other and at right angles to said track or passage, each set comprising two plungers opposite each other and on opposite sides of the tracks, of a weighted lever fulcrumed above the track or passage in advance of the said plungers to hold the lowermost can-body on said incline, and a conveyer adapted to move the can-body forward from under said lever first between one of the sets of plungers by which it is pushed across the track and one end forced into a cap and then pushed back upon the track and afterward between the other set of plungers by which it is pushed and the other end forced into another cap and the capped can pushed back upon the track in the path of the conveyer, substantially as set forth.

8. In a can-capping machine, the combination, with the track, the conveyer, and the two sets of plungers operating, as described, to successively force the can-body in opposite directions into its heads or caps, of head-feeding chutes at opposite sides of the track and delivering into chambers at the ends of the abutment-serving plunger of each pair, spring-actuated cap-arresting arms extending into the lower portions of said chutes, levers having arms projecting into the can-body passage adjacent to each set of plungers and operated by the passage of the can-bodies, and cap-arresting arms entering the cap-chutes and operated from said levers, substantially as set forth.

MATHIAS JENSEN.

Witnesses:
C. W. FULTON,
G. C. FULTON.